US007689209B1

(12) United States Patent
Spitz et al.

(10) Patent No.: US 7,689,209 B1
(45) Date of Patent: Mar. 30, 2010

(54) WIRELESS COMMUNICATION NETWORK WITH SOFTWARE MODIFICATION LOCKING

(75) Inventors: Sean T. Spitz, Olathe, KS (US); Larry H. Piercy, St. Joseph, MO (US); Patrick J. Luedders, Rantoul, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 637 days.

(21) Appl. No.: 11/556,930

(22) Filed: Nov. 6, 2006

(51) Int. Cl.
*H04M 3/00* (2006.01)

(52) U.S. Cl. .................. 455/419; 455/418; 455/423; 455/428; 455/436; 455/562.1; 370/331

(58) Field of Classification Search ......... 455/418–420, 455/423, 436–444, 428, 560, 432.1, 433, 455/456.1, 562.1; 370/331–332, 328, 338
See application file for complete search history.

(56) References Cited

U.S. PATENT DOCUMENTS

| | | | | |
|---|---|---|---|---|
| 5,794,241 A * | 8/1998 | Loaiza | ................... | 707/8 |
| 6,011,976 A * | 1/2000 | Michaels et al. | ............. | 455/466 |
| 6,212,511 B1 * | 4/2001 | Fisher et al. | ................... | 707/1 |
| 6,449,365 B1 * | 9/2002 | Hodges et al. | ............. | 379/9.02 |
| 6,499,031 B1 * | 12/2002 | Hopmann et al. | .............. | 707/8 |
| 6,628,933 B1 * | 9/2003 | Humes | ................... | 455/404.1 |
| 6,816,952 B1 * | 11/2004 | Vartti et al. | ................. | 711/163 |
| 2002/0091815 A1 * | 7/2002 | Anderson et al. | ........... | 709/223 |

* cited by examiner

*Primary Examiner*—Kamran Afshar (57) ABSTRACT

A wireless communication network comprises antenna systems, a mobile switching system, and a monitoring system. The antenna systems exchange user communications with mobile user devices in a wireless communication format. The mobile switching system has software to control operations. The mobile switching system routes the user communications between the antenna systems and network communication systems. The monitoring system determines that a software lock should be implemented for the mobile switching system, and in response, transfers a software lock instruction to the mobile switching system. The mobile switching system receives the software lock instruction and subsequently receives a request for a software modification. The mobile switching system denies the request for the software modification in response to the software lock instruction.

20 Claims, 5 Drawing Sheets

FIGURE 5

WIRELESS COMMUNICATION NETWORK WITH SOFTWARE MODIFICATION LOCKING

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of wireless communications, and in particular, to wireless communication networks that lock mobile switching systems to prevent software modifications.

2. Description of the Prior Art

The demand for wireless communication services, such as telephony and Internet access, is rapidly growing. The growing demand has caused wireless communication networks to deploy numerous mobile switching systems that provide wireless communication services. A mobile switching system is controlled by internal software that is frequently modified by external systems.

The software modifications may delete or edit the existing software or add new software. The software modifications may be initiated manually by a human operator or be initiated automatically by a computer system or process. The software modifications are often performed by the supplier of the mobile switching system (which is typically owned by a communication network). As the demand for wireless communication services grows, the amount of these software modifications has also increased.

Unfortunately, wireless network personnel who need to be aware of the software modifications may not be properly notified of the change. This situation is exacerbated when the software is automatically modified by the supplier, because notification across the supplier-network corporate boundary may not be effective—especially when automatically initiated by a computer. Compounding the problem is a lack of information about software modifications even when network personnel are notified.

The lack of effective notice for software modifications may be critical. For example, emergency 911 software may be automatically modified by a supplier system. The software modification could occur without proper notification to network personnel who are responsible for the emergency 911 service. The software modification may cause the mobile switching system to operate differently causing inter-operability issues with other systems. The inter-operability issues could degrade the emergency 911 service, and the degradation of the emergency 911 service could be catastrophic.

The lack of control over software modifications can cause other problems. As stated above, the software modifications to mobile switching systems may cause inter-operability issues with other systems, and these issues can lead to service degradation. Although the software modifications may be a necessary at some point, there are certain scenarios where the corresponding service degradation is not acceptable.

For example, there could be a large event, such as a convention, that will stress particular mobile switching systems for a time period. Service degradation on those systems during that time period should be avoided. After the event, the service degradation resulting from the software modifications could be better tolerated. In another example, a portion of the communication network may be down due to a fault, and service degradation in the remaining portion of the communication network should be avoided. Again, the service degradation resulting from the software modifications could be better tolerated after the fault is fixed and the entire network is operational.

SUMMARY OF THE INVENTION

Examples of the invention include wireless communication systems and their methods of operation. In some examples, the wireless communication network comprises antenna systems, a mobile switching system, and a monitoring system. The antenna systems exchange user communications with mobile user devices in a wireless communication format and hand-off the mobile user devices between one another. The mobile switching system has software to control operations. The mobile switching system routes the user communications between the antenna systems and network communication systems. The mobile switching system controls the hand-offs of the mobile user devices between the antenna systems. The monitoring system determines that a software lock should be implemented for the mobile switching system, and in response, transfers a software lock instruction to the mobile switching system. The mobile switching system receives the software lock instruction and subsequently receives a request for a software modification. The mobile switching system denies the request for the software modification in response to the software lock instruction.

In some examples, the monitoring system determines a characteristic for the software lock, selects a set of communication network personnel based on the characteristic, and transfers a notice indicating the software lock to the selected set of the communication network personnel In some examples, the mobile switching system indicates the denied request for the software modification to the monitoring system, and the monitoring system transfers another notice indicating the denied request to the selected set of the communication network personnel.

In some examples, the characteristic used to select the set of the communication network personnel comprises an identity of the mobile switching system.

In some examples, the characteristic used to select the set of the communication network personnel comprises a geographic location of the mobile switching system.

In some examples, the software lock is for a specific file in the software, and the request for the software modification is for the specific file. The mobile switching system denies the request for the software modification to the specific file but implements other requests for other software modifications to other files.

In some examples, the specific file is a call processing table.

In some examples, the software lock is for a specific file structure in the software, and the request for the software modification is for the specific file structure. The mobile switching system denies the request for the software modification to the specific file structure but implements other requests for other software modifications.

In some examples, the software lock is for a specific user, and the request for the software modification is from the specific user. The mobile switching system denies the request for the software modification from the specific user but implements other requests for other software modifications from other users.

In some examples, the software lock instruction indicates a time period. The mobile switching system receives another request for the software modification after the time period and implements the other request for the software modification.

In some examples, the monitoring system receives a software lock command and determines that the software lock should be implemented based on the software lock command.

In some examples, the monitoring system determines that a software unlock should be implemented for the mobile switching system, and in response, transfers a software unlock instruction to the mobile switching system. The mobile switching system receives the software unlock instruction and subsequently receives another request for the software modification. The mobile switching system implements the other request for the software modification in response to the software unlock instruction.

In some examples, the monitoring system receives a software unlock command and determines that the software unlock should be implemented based on the software unlock command.

In some examples, the monitoring system is transfers a notice indicating the software unlock to a selected set of the communication network personnel.

In some examples, the mobile switching system receives another request for the software modification including an emergency code, and implements the other request for the software modification in response to the emergency code.

In some examples, the software lock instruction indicates the emergency code.

In some examples, the mobile switching system indicates the implemented other request for the software modification to the monitoring system. The monitoring system transfers a notice indicating the implemented other request to a selected set of communication network personnel.

In some examples, the software lock is for specific files in the software related to an emergency 911 service, and the request for the software modification is for the specific files. The mobile switching system denies the request for the software modification to the specific files but implements other requests for other software modifications.

In some examples, the software lock is for specific files in the software related to a video communication service, and the request for the software modification is for the specific files. The mobile switching system denies the request for the software modification to the specific files but implement other requests for other software modifications.

In some examples, the software lock is for specific files in the software related to a geographic location service, and the request for the software modification is for the specific files. The mobile switching system denies the request for the software modification to the specific files but implements other requests for other software modifications.

BRIEF DESCRIPTION OF THE DRAWINGS

The same reference number represents the same element on all drawings.

DETAILED DESCRIPTION OF THE PREFERRED EMBODIMENT

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Wireless Communication Network

Figure 1:
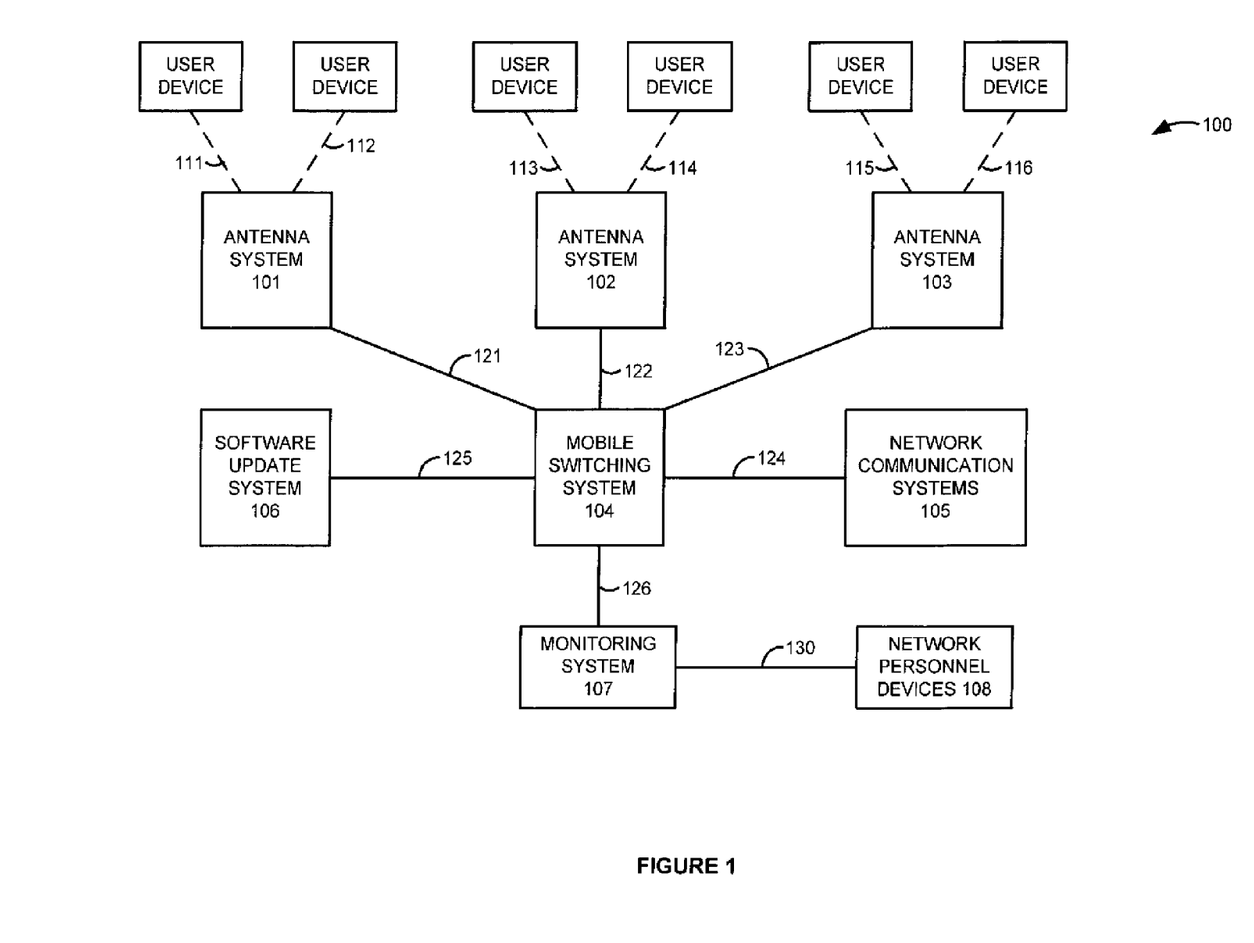
FIG. 1 illustrates a wireless communication network in an example of the invention.

FIG. 1 illustrates wireless communication network 100 in an example of the invention. Wireless communication network 100 includes antenna systems 101-103, mobile switching system 104, network communication systems 105, software update system 106, update monitoring system 107, and network personnel devices 108. Antenna systems 101-103 exchange user communications with mobile user devices in a wireless communication format over wireless communication links 111-116. The wireless communication format could be Code Division Multiple Access (CDMA), Global System for Mobile communication (GSM), Wireless Fidelity (WIFI), Worldwide Interoperability Microwave Access (WIMAX), or some other communication format that communicates over the air without physical lines. The number of systems 101-107 has been restricted for clarity, and if desired, there could be more of these systems in network 100 that operate as described herein. For example, there would typically be several more antenna systems and mobile switching systems that operate as described below.

Antenna systems 101-103 could be cellular base stations, wireless hotspots, or some other system that communicates with user devices using a wireless communication format. As a user device moves around, antenna systems 101-103 may hand-off communications with that user device. For example, if a user device that is communicating with antenna system 101 moves closer to antenna system 102, then antenna system 101 will hand-off wireless the communications with the mobile user device to antenna system 102. In some cases, the hand-off is soft, where the user device redundantly communicates through both antenna systems 101-102 at the same time, and the user communications through antenna system 101 are used before the hand-off, and the user communications through antenna system 102 are used after the hand-off.

Antenna systems 101-103 and mobile switching system 104 exchange the user communications over communication links 121-123. Mobile switching system 104 and network communication systems 105 exchange some of these user communications over communication links 124. Mobile switching system 104 also exchanges some of these user communications between antenna systems 101-103 without using network communication systems 105. Communication links 121-124 could use the air (wireless), metallic wires, optical fibers, or some other transport media. Communication links 121-124 could use CDMA, microwave, Time Division Multiplex (TDM), Internet Protocol (IP), Ethernet, Synchronous Optical Network (SONET), Wave Division Multiplexing (WDM), or some other communication protocol—and various combinations of these communication protocols could be used.

Mobile switching system 104 routes the user communications between links 121-124 to effectively route the user communications between the user devices, or between the user devices and network communication systems 105. Mobile switching system 104 also controls the hand-offs of the mobile user devices between antenna systems 101-103. Mobile switching system 104 could comprise a Base Station Controller (BSC), Mobile Switching Center (MSC), or some other communication system that serves the wireless user devices through antenna systems 101-103. Network communication systems 105 could comprise telephone systems, Internet access systems, data systems, media (audio/video) systems, service platforms, or some other system that provides a communication service to the mobile user devices.

Software update system 106 comprises a computer system that transfers software updates to mobile switching system 104 over communication link 125. Software update system 106 could be owned and operated by the supplier of mobile switching system 104, the owner of wireless network 100, or some other entity. Software update system 106 may perform software updates manually under the direct control of a human operator. Alternatively, software update system 106 may perform software updates automatically without any direct control of a human operator.

Mobile switching system 104 has internal software that controls its operations. For example, the software may control the hand-offs and routing of the user communications. Mobile switching system 104 receives software updates from software update system 106 over link 125. In response to the software updates, mobile switching system 104 implements the corresponding software modification to its software.

The entity that initiates the software modification has a user ID and authorization code that are provided along with the request to modify the software. The initiating entity could be a human operating a computer system, a computer system configured for automatic updates, or a computer process configured for automatic updates. Software update system 106 represents all of these systems and processes. Mobile switching system 104 has an internal authorization database that stores user IDs and authorization codes for the entities that are authorized to initiate software modifications. These authorizations may be restricted to specific files in the software and specific timeframes by the authorization database. Before implementing a software modification, mobile switching system 104 verifies the user ID and authorization code against the authorization database to ensure that the software modification is authorized.

Monitoring system 107 communicates with mobile switching system 104 over communication link 126 to detect the software modifications implemented in mobile switching system 104. If a software modification is detected, monitoring system 107 determines a characteristic for the software modification. Monitoring system 107 then selects a set of communication network personnel based on the characteristic. The selection of network personnel could entail the selection of contact information for devices 108 used by the selected network personnel. Monitoring system 107 transfers notices indicating the software modification to the selected set of the communication network personnel over communication network 130 and devices 108.

For example, monitoring system 107 could detect that emergency 911 software in mobile switching system 104 has been modified. In response, monitoring system 107 could send emails to a first set of network personnel responsible for mobile switching system 104. Monitoring system 107 could also send emails to a second set of network personnel responsible for the emergency 911 service.

Monitoring system 107 also determines when software locks should be implemented for mobile switching system 104. In response, monitoring system 107 transfers a software lock instruction to mobile switching system 104. Mobile switching system 104 receives the software lock instruction and subsequently receives a corresponding request for a software modification from software update system 106. Mobile switching system 104 denies the corresponding request for the software modification in response to the software lock instruction.

Monitoring system 107 also determines a characteristic for the software lock, and selects a set of communication network personnel based on the characteristic. Monitoring system 107 then transfers a notice indicating the software lock to the selected set of the communication network personnel over communication network 130 and devices 108.

For example, network personnel responsible for emergency 911 service may want to prevent any modifications to the emergency 911 software in mobile switching system 104 during a nearby state fair. These network personnel transfer a lock command for the emergency 911 software to monitoring system 107, and in response, system 107 transfers a corresponding lock instruction to mobile switching system 104. In response, mobile switching system 104 denies any requests to modify its emergency 911 software for the duration of the state fair. After the fair, mobile switching system 104 would be unlocked, and the software modifications could be implemented. In addition, monitoring system 107 could send emails indicating the software lock to a first set of network personnel responsible for mobile switching system 104 and to a second set of network personnel responsible for the emergency 911 service.

Communication network 130 could be a Local Area Network (LAN), Wide Area Network (WAN), enterprise network, Internet, telephone network, some other type of communication network, or combinations of these networks. Network personnel devices 108 could be computers, telephones, personal digital assistants, pagers, or some other type of user communication device. The notice could be an electronic mail, voice message, page, text message, screen pop, audio signal, video signal, or some other form of user communication.

Figure 2:
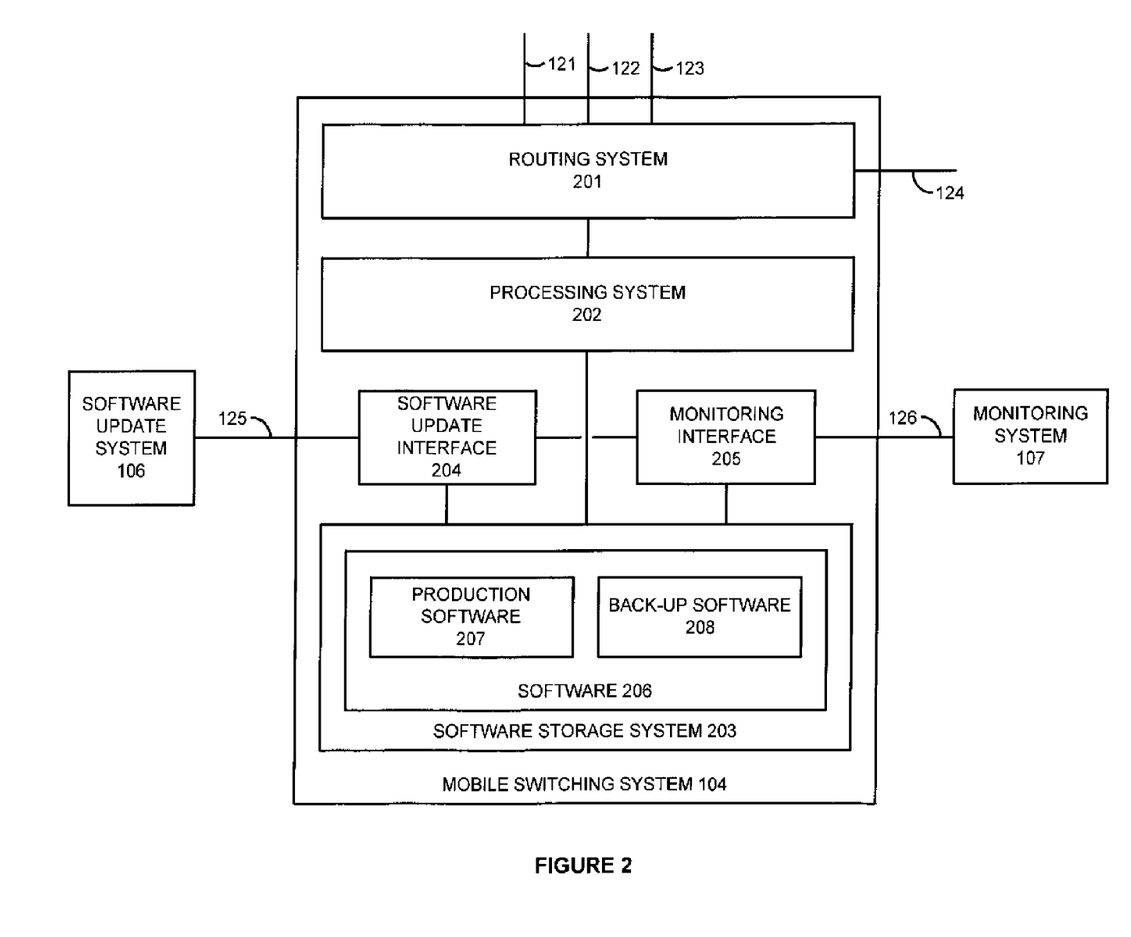
FIG. 2 illustrates a mobile switching system in an example of the invention.

FIG. 2 illustrates mobile switching system 104 in an example of the invention. Mobile switching system 104 comprises routing system 201, processing system 202, software storage system 203, software update interface 204, and monitoring interface 205. Software storage system 203 stores software 206. Software 206 includes production software 207 and back-up software 208. Routing system 201 transfers user communications among links 121-124 under the control of processing system 202. Processing system 202 controls the routing of user communications—typically in response to signaling received over links 121-124. Processing system 202 controls the hand-off of mobile user devices by antenna systems 101-103. Processing system 202 may also perform other operations, such as user authentication, authorization, and accounting. Processing system 202 retrieves and executes production software 207 to perform these operations. Back-up software 208 is an archival copy of production software 207.

Software update interface 204 receives requests for software modifications from software update system 106 over link 125. Software update interface 204 verifies that the requested software modification is authorized, and if so, interface 204 directs software storage system 203 to implement the corresponding software modifications to software 206. To control software modifications, software update interface 204 implements software locks and unlocks as described herein.

Monitoring interface 205 communicates with monitoring system 107 over communication link 126, and in response, monitoring interface 205 retrieves software modification information from software storage system 203. Monitoring interface 205 transfers the software modification information to monitoring system 107 over communication link 126. Monitoring interface 205 also receives software lock and unlock instructions from monitoring system 107 over communication link 126, and in response, monitoring interface 205 transfers the software lock and unlock instructions to software update interface 204. Software interface 204 controls software modifications in accord with the lock and unlock instructions.

Figure 3:
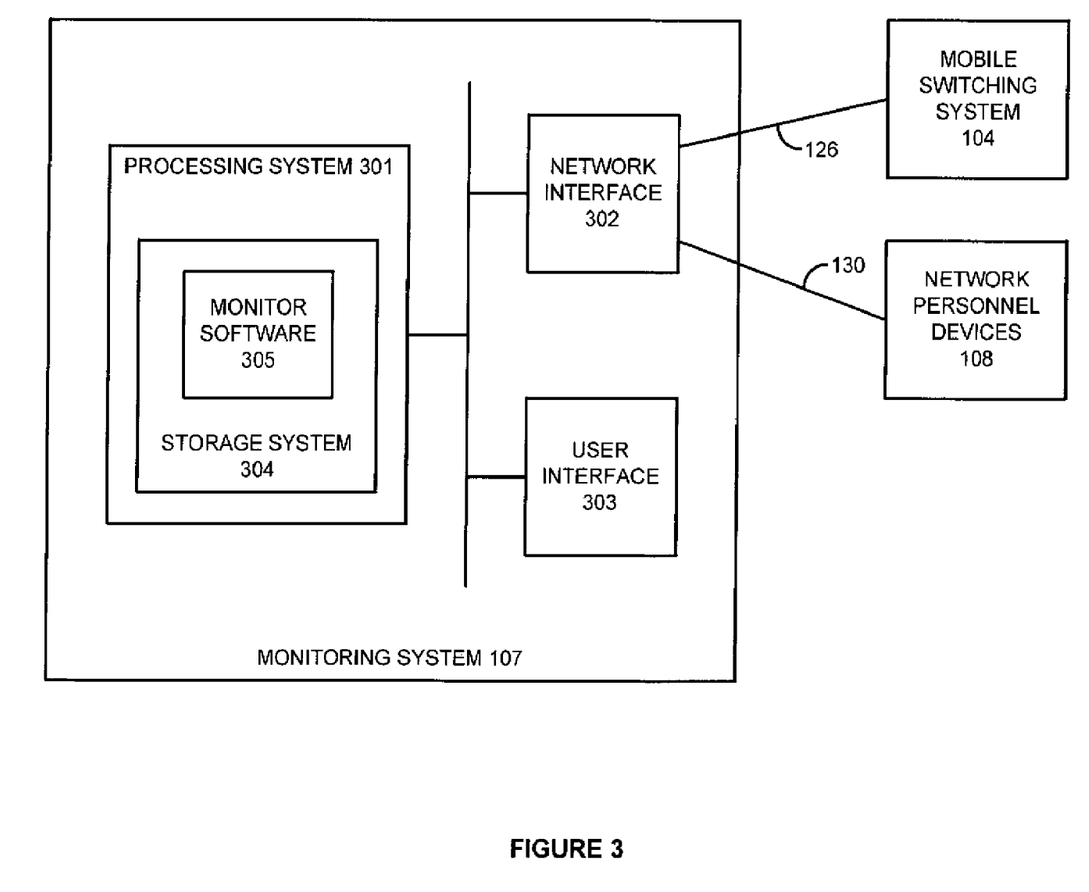
FIG. 3 illustrates a software update monitoring system in an example of the invention.

FIG. 3 illustrates software update monitoring system 107 in an example of the invention. Monitoring system 107 includes processing system 301, network interface 302, and user interface 303. Processing system 301 includes storage system 304. Storage system 304 stores monitor software 305. Processing system 301 is linked to network interface 302 and user interface 303. Monitoring system 107 could be comprised of a programmed general-purpose computer, although those skilled in the art will appreciate that programmable or special purpose circuitry and equipment may be used. Monitoring system 107 may use a distributed architecture where operations are allocated to multiple devices that together comprise elements 301-305.

Processing system 301 could comprise a computer microprocessor, logic circuit, or some other processing device. Network interface 302 could comprise a network card, modem, port, or some other interface device. User interface 303 could comprise a keyboard, mouse, voice recognition interface, microphone and speakers, graphical display, touch screen, or some other type of user device. Storage system 304 could comprise a disk, tape, integrated circuit, server, or some other memory device. Systems and interfaces 301-304 could be distributed among multiple devices. Processing system 301 retrieves and executes monitor software 305 from storage system 304. Monitor software 305 may comprise an operating system, utilities, drivers, networking software, and other software typically loaded onto a general-purpose computer. Monitor software 305 could comprise an application program, firmware, or some other form of machine-readable processing instructions. When executed by processing system 301, monitor software 305 directs processing system 301 to operate monitoring system 107 as described herein.

Software Modification Detection

Figure 4:
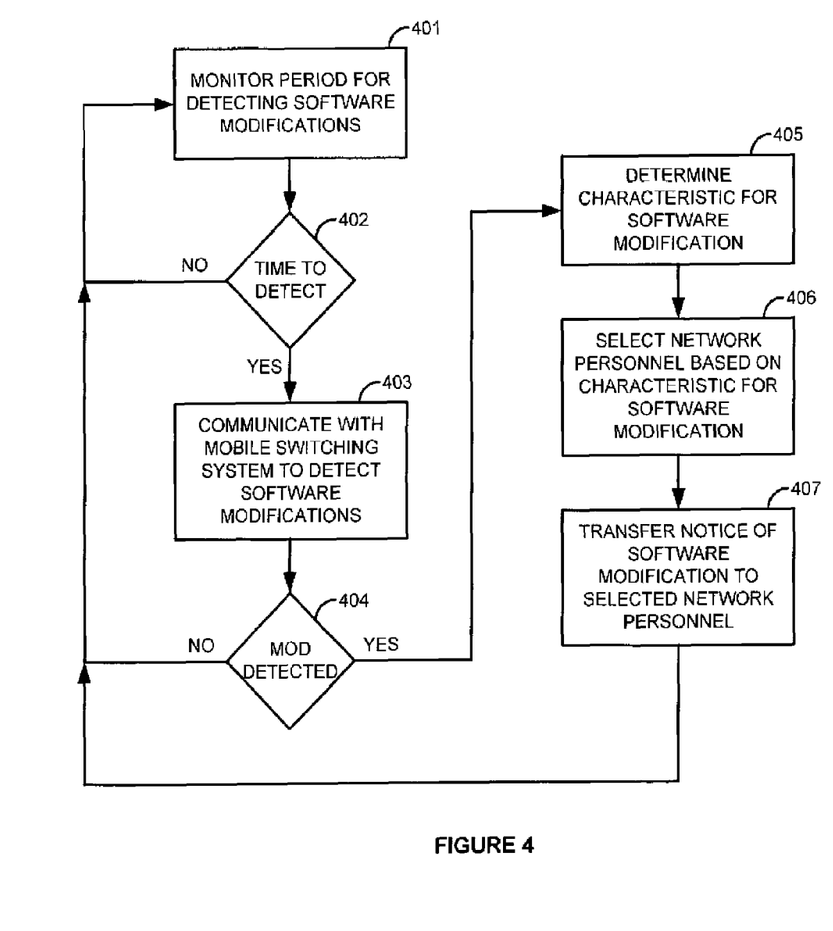
FIG. 4 illustrates the operation of a software update monitoring system in an example of the invention.

FIG. 4 illustrates the operation of software update monitoring system 107 in an example of the invention. The process starts at step 401, where monitoring system 107 monitors the time period for detecting software modifications. If it is not time to detect modifications in step 402, then monitoring system 107 returns to step 401. If it is time to detect modifications in step 402, then monitoring system 107 communicates with mobile switching system 104 to detect software modifications in step 403. If a software modification is not detected in step 404, then monitoring system 107 returns to step 401. If a software modification is detected in step 405, then monitoring system 107 determines a characteristic for the software modification in step 405. Monitoring system 107 selects network personnel based on the characteristic for the software modification in step 406. Monitoring system 107 transfers notices of the software modification to network personnel in step 407, and the process returns to step 401.

Some optional features for the above process are discussed below.

Typically, monitoring system 107 communicates with mobile switching system 104 on a daily basis to detect software modifications, although other time periods could be used. Daily detection of software modifications allows the modifications to be accurately dated by monitoring system 107. Night may be the best time to detect software modifications, since mobile switching system 107 is probably less busy at night.

Monitoring system 107 may use various techniques to detect a software modification. In one technique, monitoring system 107 periodically retrieves and stores file names for the various files in software 206. Monitoring system 107 then compares the currently retrieved file names to the previously stored file names for the various files in software 206. A software modification is detected if a currently retrieved file name does not match any previously stored file name (new software). A software modification is detected if a previously stored file name does not match any currently retrieved file name (deleted software).

In another technique, monitoring system 107 periodically retrieves and stores version numbers for the various files in software 206. Monitoring system 107 then compares the currently retrieved version numbers to the previously stored version numbers for the various files in software 206. A software modification is detected for a software file if the currently retrieved version number does not match the previously stored version number.

In another technique, monitoring system 107 periodically retrieves and stores file sizes for the various files in software 206. Monitoring system 107 then compares the currently retrieved file sizes to the previously stored file sizes for the various files in software 206. A software modification is detected for a software file if the currently retrieved file size does not match the previously stored file size.

In another technique, monitoring system 107 periodically retrieves and stores descriptions for the various files in software 206. Monitoring system 107 then compares the currently retrieved descriptions to the previously stored descriptions for the various files in software 206. A software modification is detected for a software file if the currently retrieved description does not match the previously stored description.

In another technique, monitoring system 107 periodically retrieves and stores file structures for the various files in software 206. Monitoring system 107 then compares the currently retrieved file structures to the previously stored file structures for the various files in software 206. A software modification is detected for a software file if the currently retrieved file structure and the previously stored file structure differ in some aspect.

The file structure could be a call processing table having columns and rows. Examples of such table structures are tables that correlate user IDs to home location registrars and tables that correlate called numbers to routes. A software modification could be detected if the currently retrieved table structure and the previously stored table structure differ by a column or differ by a row.

Monitoring system 107 can use various characteristics to select the communication network personnel to notify. For each characteristic, monitoring system 107 stores notification information indicating the communication network personnel to notify. Characteristics include: the identity of the mobile switching system, the geographic location of the mobile switching system, the identity of an entity that initiated the software modification, the file in the software that is modified, or the aspect in the current file structure that differs from the previous file structure. For example, the characteristic could be the specific column or row that differs in a call processing table.

Monitoring system 107 can provide network personnel with remote access to software modifications over user interface 303 or communication network 130. For each software modification, monitoring system 107 would retrieve and store the modified software. Network personnel could then request the software modification from monitoring system 107, and in response, monitoring system 107 would transfer a copy of the software modification to the requesting personnel over user interface 303 or communication network 130 and devices 108. For example, a network technician could request notification if emergency 911 software is modified in mobile switching system 104. The network technician would then receive an email if the emergency 911 software is modified, and in response to the email, the technician could obtain a copy of the modified emergency 911 software to check its interoperability with other systems.

Monitoring system 107 can maintain a model of software 206 by date. Monitoring system 107 would store the original software 205. For each software modification, monitoring system 107 would retrieve and store the modified software by date. Network personnel could then input a date to monitoring system 107, and in response, monitoring system would provide a copy of software 205 on that date by accumulating all software modifications to the original software up to that date.

Monitoring system 107 could also verify that mobile switching system 104 is maintaining an accurate copy of back-up software 208. During its periodic communication to detect software modifications, monitoring system 107 would check the file size of production software 207 against the file size of back-up software 208. Monitoring system 107 would notify network personnel if the production and back-up file sizes differ by a specified amount, since different files sizes could indicate that back-up software 208 is not an accurate copy of production software 207.

Monitoring system 107 can also search for key terms related to software modifications and provide notice based on key term matches. In some examples, a software modification includes a description. The description is typically an abstract that states the specific file in software 206 that is being changed and that states the purpose and functionality of the change. In response to detecting a software modification, monitoring system 107 retrieves the description for the software modification.

Monitoring system 107 stores a key term and associated notification information that was previously input by network personnel through interfaces 302-303. Monitoring system 107 searches the description for the key term to determine if a match exists between the key term and the description. If a match is found, then monitoring system 107 selects network personnel based on the associated notification information and notifies the selected network personnel. Thus, an individual could specify a key term and their email address to monitoring system 107, and in response, monitoring system 107 would email them with a notice when the key term shows up in the description of a software modification. The key term could be related to an emergency 911 service, video communication service, geographic location service, or some other service supported by mobile switching system 104.

In addition, monitoring system 107 stores the software descriptions in association with the dates of the corresponding software modifications. Subsequently, monitoring system 107 could receive a key term from network personnel through interfaces 302-303. Monitoring system 107 then searches the stored descriptions for the key term to determine if a match exists between the key term and any of the descriptions. If a match is found, then monitoring system 107 indicates the matching description and the date of the corresponding software modification. This subsequent key term search could be date-bounded if desired. Thus, an individual could specify a key term and the year 2006 to monitoring system 107, and in response, monitoring system 107 would search all descriptions for 2006 software modifications and indicate any matching descriptions by date.

Software Lock

Figure 5:
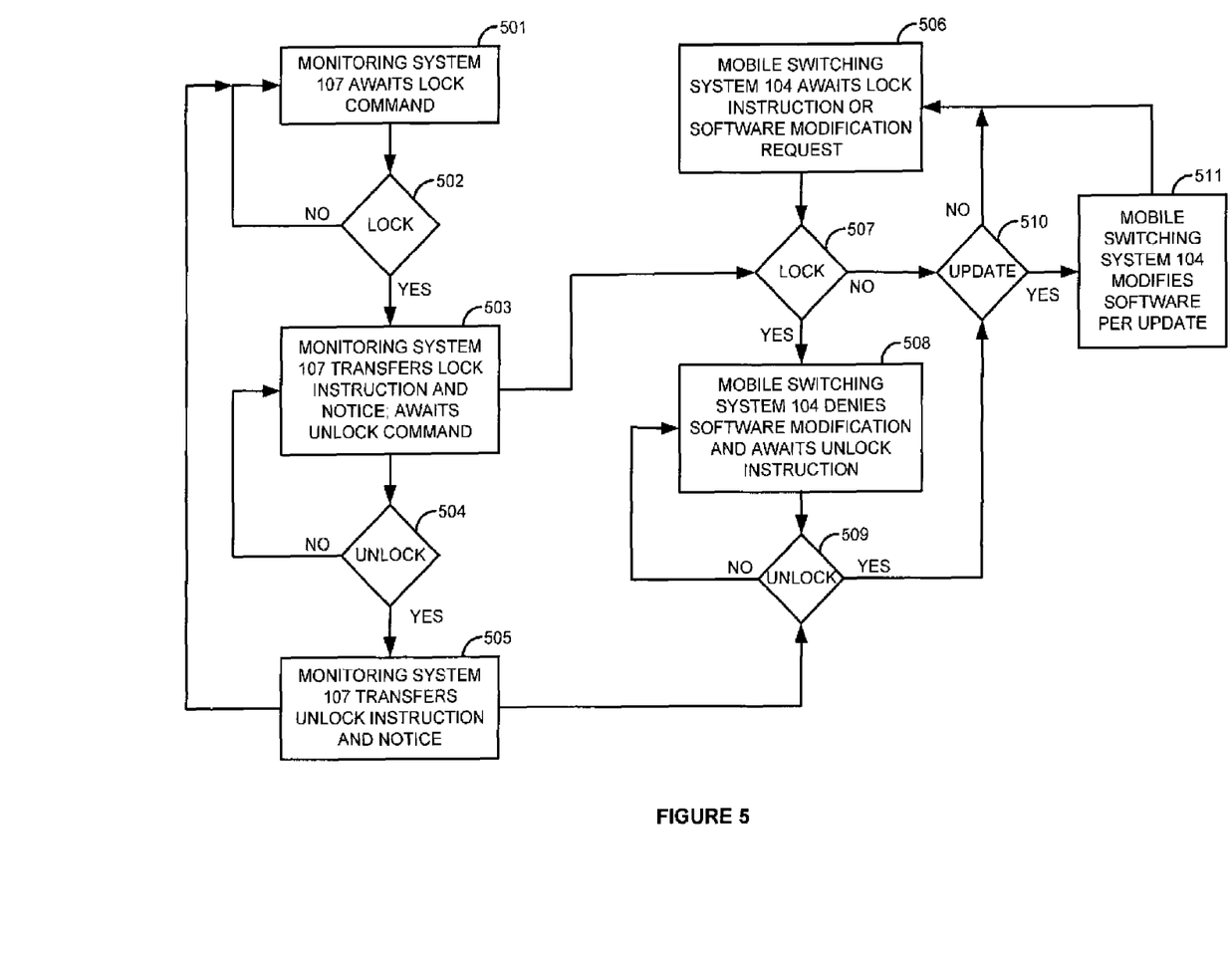
FIG. 5 illustrates the operation of a software update monitoring system and a mobile switching system in an example of the invention.

FIG. 5 illustrates the operation of mobile switching system 104 and software update monitoring system 107 in an example of the invention. In step 501, monitoring system 407 awaits a lock command. The lock command could be received through user interface 303 or through communication network 130 and devices 108. If a lock command is received in step 502, monitoring system 107 transfers a lock instruction to mobile switching system 104 over link 126 in step 503. Monitoring system 107 also transfers corresponding notice to selected network personnel over network 130 and devices 108. Monitoring system 107 then awaits an unlock command. If an unlock command is received in step 504, monitoring system 107 transfers an unlock instruction in step 505. The unlock command could be received through user interface 303 or through communication network 130 and devices 108. Monitoring system 107 also transfers corresponding notice to selected network personnel over network 130 and devices 108, and the process returns to step 501.

To transfer the corresponding notice in steps 503 or 505, monitoring system 107 determines a characteristic for the software lock/unlock and then selects a set of communication network personnel to notify based on the characteristic. The characteristic could be the identity of mobile switching system 104, a geographic location of mobile switching system 107, the entity who initiated the software modification, or some other metric.

In step 506, mobile switching system 104 awaits a lock instruction or a request for a software modification. If a lock instruction is received in step 507, mobile switching system 104 denies any corresponding request for a software modification and then awaits an unlock instruction in step 508. If no lock instruction is received in step 507, and if no software modification request is received in step 510, then the process returns to step 506. To implement the software lock, monitoring interface 205 receives and passes the lock instruction to software update interface 204 in mobile switching system 204, and software update interface 204 implements the software lock. Software update interface 204 could implement the software lock for specific files, files structures, or users.

If no lock instruction is received in step 507, and if a software modification request is received in step 510, then mobile switching system 104 implements the requested software modification in step 511, and the process returns to step 506. If an unlock instruction is received in step 509, then the process proceeds to step 510. If no unlock instruction is received in step 509, then the process returns to step 508.

Some optional features of the above process are described below. In step 508, mobile switching system 104 denies a software modification request. In response to the denial, mobile switching system 104 could indicate the denied request to monitoring system 107, and monitoring system 107 could transfer another notice indicating the denied software modification request to the selected set of the communication network personnel. Typically, this would be the same personnel notified of the lock, but could also include the entity who requested the software modification.

The software lock could be for a specific file in the software. If the request for the software modification is for this specific file, the mobile switching system 104 denies the request to modify the specific file, but mobile switching system 104 would still implement other requests for other software modifications to other files. The specific file could be a call processing table. The specific file could be related to an emergency 911 service, a video communication service, a geographic location service, or some other service supported by mobile switching system 104.

The software lock could be for a specific file structure in the software. If the request for the software modification is for this specific file structure, the mobile switching system 104 denies the request to modify the specific file structure, but mobile switching system 104 would still implement other requests for other software modifications. The specific file structure could be the columns in a call processing table. Thus, an entry in the table could be modified, but the structure of the table (columns and rows) could not be modified.

The software lock could be for software modification requests from a specific user. If the request for the software modification is from the specific user, the mobile switching system 104 denies the request to modify the software, but mobile switching system 104 would still implement other requests for software modifications from other users.

The software lock could be for a specified time period, and the time period could be specified by network personnel in the lock command. Monitoring system 107 would then indicate the time period for the software lock in the software lock instruction. Mobile switching system 104 would automatically unlock the software after the time period. Thus, if mobile switching system 104 receives a request for a software modification after the time period, mobile switching system 104 would implement the software modification.

The software lock could include an emergency override feature. The emergency override feature would be used when mobile switching system 104 is locked, but an emergency requires the software be modified. One solution could be to unlock system 107, but the unlock mechanism may be undesirable or unattainable for some reason. Thus, if mobile switching system 104 receives a request for a software modification including an emergency override code, then mobile switching system 104 would implement the request for the software modification despite the software lock. The emergency code could be programmed into software update interface 204 or could be supplied in the software lock instruction. In the event of an emergency override of a software lock, mobile switching system 104 would indicate the emergency software modification to monitoring system 107, and monitoring system 107 would transfer a notice indicating the emergency software modification to the selected set of the communication network personnel.

The invention claimed is:

1. A wireless communication network comprising:
   a plurality of antenna systems configured to exchange user communications with mobile user devices in a wireless communication format and to hand-off the mobile user devices between one another;
   a mobile switching system having software to control operations and configured to route the user communications between the antenna systems and network communication systems, to control the hand-offs of the mobile user devices between the antenna systems; and
   a monitoring system configured to determine that a software lock should be implemented for the mobile switching system, and in response, to transfer a software lock instruction to the mobile switching system; and
   the mobile switching system is further configured to receive the software lock instruction, to subsequently receive a request for a software modification, and to deny the request for the software modification in response to the software lock instruction.

2. The wireless communication network of claim 1 wherein the monitoring system is configured to determine a characteristic for the software lock, to select a set of communication network personnel based on the characteristic, and to transfer a notice indicating the software lock to the selected set of the communication network personnel.

3. The wireless communication network of claim 2 wherein the mobile switching system is configured to indicate the denied request for the software modification to the monitoring system, and the monitoring system is configured to transfer another notice indicating the denied request to the selected set of the communication network personnel.

4. The wireless communication network of claim 2 wherein the characteristic used to select the set of the communication network personnel comprises an identity of the mobile switching system.

5. The wireless communication network of claim 2 wherein the characteristic used to select the set of the communication network personnel comprises a geographic location of the mobile switching system.

6. The wireless communication network of claim 1 wherein the software lock is for a specific file in the software, the request for the software modification is for the specific file, and the mobile switching system is configured to deny the request for the software modification to the specific file but to implement other requests for other software modifications to other files.

7. The wireless communication network of claim 6 wherein the specific file is a call processing table.

8. The wireless communication network of claim 1 wherein the software lock is for a specific file structure in the software, the request for the software modification is for the specific file structure, and the mobile switching system is configured to deny the request for the software modification to the specific file structure but to implement other requests for other software modifications.

9. The wireless communication network of claim 1 wherein the software lock is for a specific user, the request for the software modification is from the specific user, and the mobile switching system is configured to deny the request for the software modification from the specific user but to implement other requests for other software modifications from other users.

10. The wireless communication network of claim 1 wherein the software lock instruction indicates a time period and the mobile switching system is further configured to receive another request for the software modification after the time period, and to implement the other request for the software modification.

11. The wireless communication network of claim 1 wherein the monitoring system is configured to receive a software lock command and determine that the software lock should be implemented based on the software lock command.

12. The wireless communication network of claim 1 wherein the monitoring system is configured to determine that a software unlock should be implemented for the mobile switching system, and in response, to transfer a software unlock instruction to the mobile switching system, and the mobile switching system is further configured to receive the software unlock instruction, to subsequently receive another request for the software modification, and to implement the other request for the software modification in response to the software unlock instruction.

13. The wireless communication network of claim 12 wherein the monitoring system is configured to receive a software unlock command and determine that the software unlock should be implemented based on the software unlock command.

14. The wireless communication network of claim 13 wherein the monitoring system is configured to transfer a notice indicating the software unlock to a selected set of communication network personnel.

15. The wireless communication network of claim 1 wherein the mobile switching system is further configured to receive another request for the software modification including an emergency code, and to implement the other request for the software modification in response to the emergency code.

16. The wireless communication network of claim 15 wherein the software lock instruction indicates the emergency code.

17. The wireless communication network of claim 15 wherein the mobile switching system is configured to indicate the implemented other request for the software modification to the monitoring system, and the monitoring system is configured to transfer a notice indicating the implemented other request to a selected set of communication network personnel.

18. The wireless communication network of claim 1 wherein the software lock is for specific files in the software related to an emergency 911 service, the request for the software modification is for the specific files, and the mobile switching system is configured to deny the request for the software modification to the specific files but to implement other requests for other software modifications.

19. The wireless communication network of claim 1 wherein the software lock is for specific files in the software related to a video communication service, the request for the software modification is for the specific files, and the mobile switching system is configured to deny the request for the software modification to the specific files but to implement other requests for other software modifications.

20. The wireless communication network of claim 1 wherein the software lock is for specific files in the software related to a geographic location service, the request for the software modification is for the specific files, and the mobile switching system is configured to deny the request for the software modification to the specific files but to implement other requests for other software modifications.

* * * * *